Patented June 13, 1950

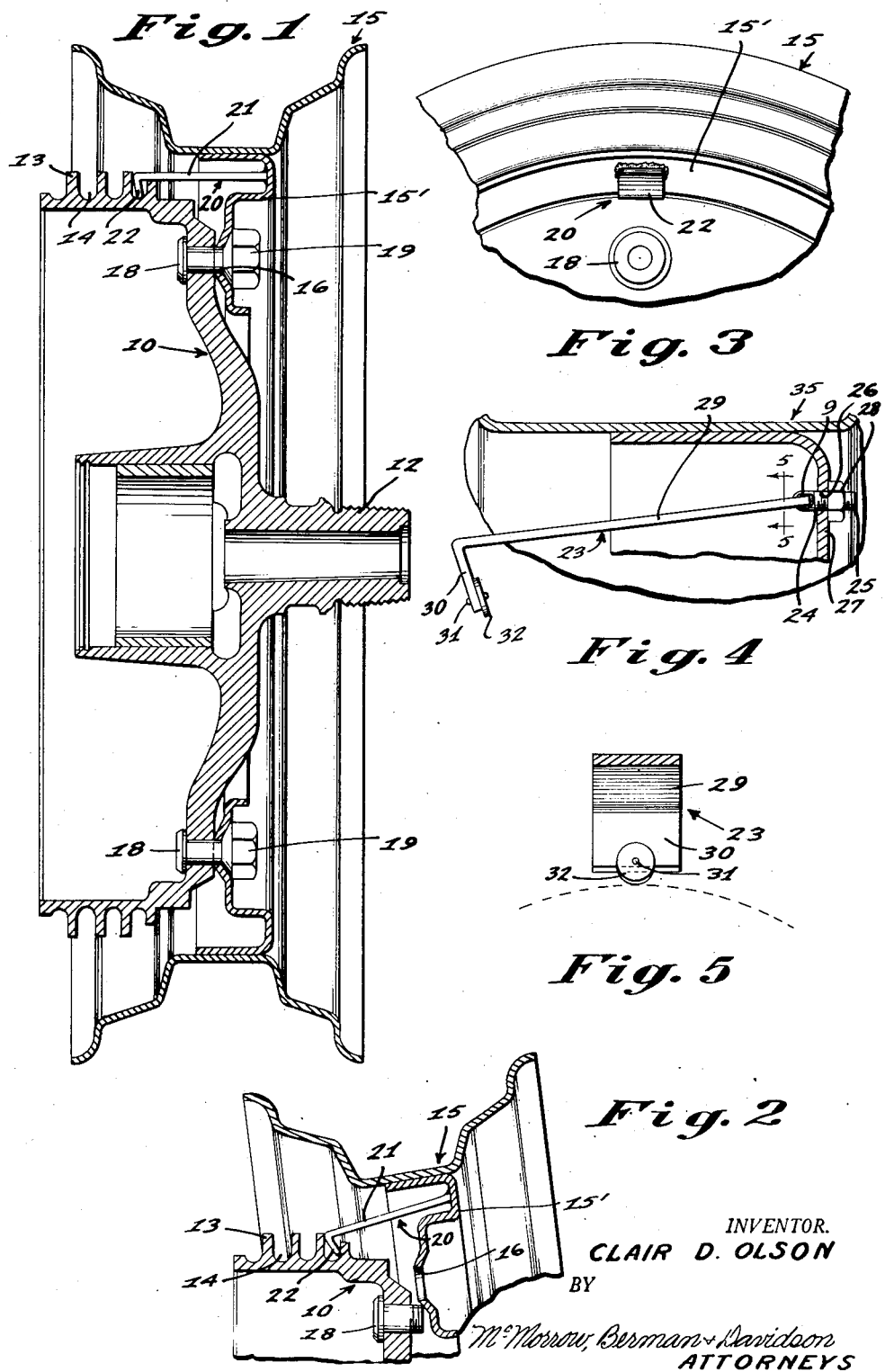

2,511,000

UNITED STATES PATENT OFFICE 2,511,000

WHEEL MOUNTING MEANS

Clair D. Olson, Farmington, N. Mex.

Application July 9, 1948, Serial No. 37,890

3 Claims. (Cl. 301—5)

This invention relates to a wheel mounting means.

An object of the invention is to provide a disc wheel with a means enabling the wheel to be readily mounted upon a brake drum without application of a manually-directed lifting force. Another object of the invention is to provide a disc wheel with a means which enables the wheel to be held in a lean-to position with respect to a brake drum, and which, upon elevation of the drum in alignment with the wheel, causes the wheel to become attached to the brake drum.

A further object of the invention is to provide a tool for attachment to a vehicle wheel which is simple in construction, easy to manipulate, and highly efficient in action.

Other objects and advantages will become apparent from the following description.

An embodiment of the invention is illustrated by way of example in the accompanying drawing, wherein:

Figure 1 is a side elevational sectional view of a disc wheel in assembled relation upon a vehicle brake drum, including the mounting means of the present invention.

Figure 2 is a fragmentary sectional view showing the disc wheel in a lean-to position with respect to the vehicle brake drum, with the mounting means of the present invention in engagement with a groove of the brake drum flange.

Figure 3 is a fragmentary front elevational view of the portion of the disc wheel carrying the mounting means according to the present invention.

Figure 4 is a fragmentary side elevational sectional view of the modified form of the mounting means according to the present invention.

Figure 5 is a fragmentary sectional view taken on the line 5—5 of Figure 4.

Referring to Figures 1 to 3, of the drawings, the numeral 10 designates a conventional wheel drum comprising a hub flange 12 having plurality of lug bolts 18 projecting outwardly therefrom. The periphery of the drum 10 is provided with a plurality of spaced parallel fins 13 defining a plurality of annular grooves 14 therebetween.

A disc wheel 15 provided with a plurality of spaced apertures 16 which receive the lug bolts 18 is arranged centrally on the brake drum, the lug bolts being secured in place by means of nuts 19.

Secured to the inner face of the disc 15' of the wheel 15 as by welding is the mounting means 20 of the present invention, said means embodying an elongated flat bar 21. The bar 21 is preferably fabricated of steel having a slight degree of resiliency, the bar 21 having its end bent inwardly so as to form a hook 22, which is in engagement with one of the annular grooves 14 on the periphery of the drum 10.

In the embodiment illustrated in Figures 4 and 5, the mounting means 23 is fabricated of steel having a slight degree of resiliency and comprises a short bolt 24 provided with a threaded end 25 for insertion in an aperture 26 in the disc 27 of the wheel 35, the bolt 24 being releasably secured to the disc 27 by means of a nut 28 threaded on the threaded end 25 of the bolt 24. Seated in a slot 9 in the other end of the bolt 24 and secured therein, as by welding, is a flat elongated bar 29 provided with an inwardly bent end so as to form a hook 30. Carried by the hook 30 is a pin 31 on which is rotatably mounted a roller 32 for engagement with one of the annular grooves 14 of the drum 10.

In operation, the disc wheel 15 is placed in a lean-to position with respect to the vehicle brake drum 10, and the height of the drum 10 is then adjusted by means of a suitable jack (not shown), so that the hook 22 of the mounting means 20 will engage or grip one of the grooves 14 of the brake drum 10, Figure 2, with the wheel 15 and mounting means 20 thus positioned, the vehicle brake drum is further elevated by means of the jack. With the further elevation of the jack, the wheel 15 is caused to be pulled toward and on to the brake drum 10, thereby resulting in the wheel 15 becoming attached to the brake drum.

In certain instances, it may be necessary to rotate the wheel 15 slightly in order to align the aperture 16 with the lug bolts 18, whereupon the rotatable roller 32 of the mounting means 23 of the form shown in Figures 4 and 5, is in rolling engagement with one of the grooves 14 of the drum 10 to thereby facilitate the alignment of the wheel with the drum.

As shown in Figure 4 of the drawing, the mounting means 23 may be made as a unit separate from the vehicle wheel and maintained in a convenient location on the vehicle until needed.

It is believed that the details of construction, manner of use and advantages of the device will be readily understood from the foregoing without further detailed explanation.

It is to be understood, however, that even though I have herein shown and described a preferred embodiment of my invention, the same is susceptible of certain changes fully comprehend-

What is claimed is:

1. The combination with a vehicle wheel drum including a plurality of spaced parallel grooves on its periphery thereof, and a disc wheel adapted to be mounted on said drum, of a mounting means on the inner face of the disc of said wheel, said mounting means embodying a resilient bar having one end secured to the wheel disc and having the other end in engagement with one of the grooves of said drum when the wheel is in a lean-to position with respect to said drum, and upon elevation of said drum to an aligned position with said wheel causing the wheel to be pulled on to said drum.

2. The combination with a vehicle wheel drum including a plurality of spaced parallel grooves on its periphery thereof, and a disc wheel adapted to be mounted on said drum, of a mounting means on the inner face of the disc of said wheel, said mounting means being in engagement with one of the grooves of said drum when the wheel is in a lean-to position with respect to said drum, and upon elevation of said drum to an aligned position with said wheel causing the wheel to be pulled on to said drum, said mounting means comprising a flat resilient bar having one end secured to said wheel disc, and an inwardly extending hook on the other end of said bar for coacting with one of said grooves.

3. The combination with a vehicle wheel drum including a plurality of spaced parallel grooves on its periphery thereof, and a disc wheel adapted to be mounted on said drum, of a mounting means on the inner face of the disc of said wheel, said mounting means being in engagement with one of the grooves of said drum when the wheel is in a lean-to position with respect to said drum, and upon elevation of said drum to an aligned position with said wheel causing the wheel to be pulled on to said drum, said mounting means comprising a flat resilient bar having one end secured to said wheel disc, an inwardly extending hook on the other end of said bar, and a rotatable roller carried by said hook for engagement with one of said grooves.

CLAIR D. OLSON.

REFERENCES CITED

The following references are of record in the file of this patent:

UNITED STATES PATENTS

| Number | Name | Date |
| --- | --- | --- |
| 1,384,405 | Putnam | July 12, 1921 |
| 1,815,821 | Baker | July 21, 1931 |

FOREIGN PATENTS

| Number | Country | Date |
| --- | --- | --- |
| 617,253 | France | 1927 |